Sept. 29, 1970 G. W. WEISSENBERG 3,531,641
THERMOLUMINESCENT DOSIMETER FOR REPETITIVE ANALYSIS
Filed Dec. 21, 1966
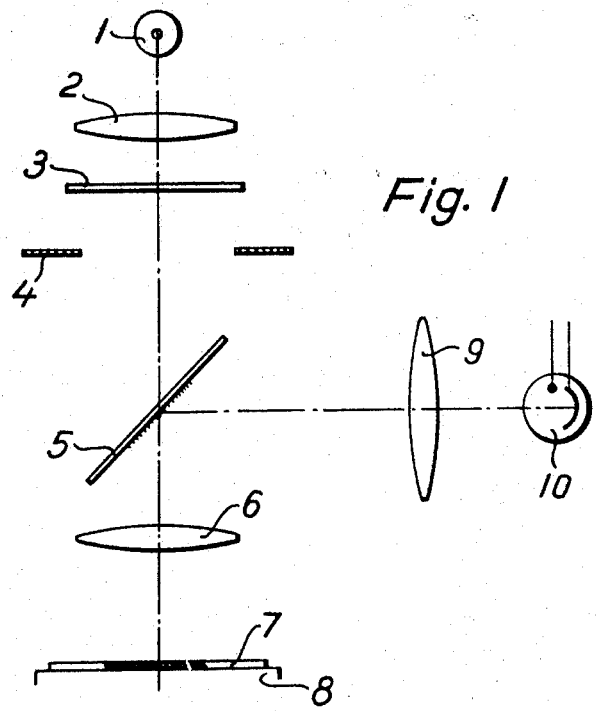
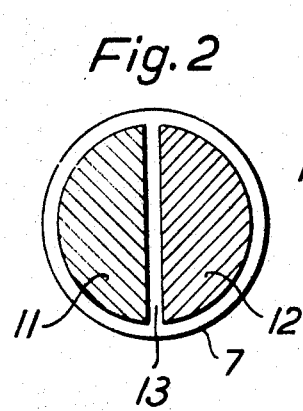
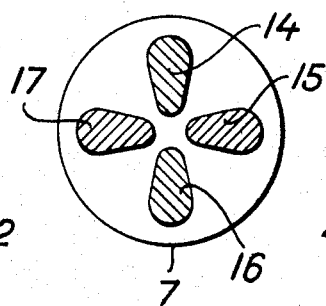
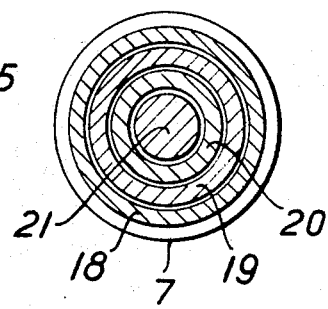
GUSTAV WEISSENBERG
INVENTOR
BY Rauber & Lazar
HIS ATTORNEYS United States Patent Office 3,531,641
Patented Sept. 29, 1970

3,531,641
THERMOLUMINESCENT DOSIMETER FOR REPETITIVE ANALYSIS
Gustav Weissenberg, Wetzlar, Germany, assignor to Ernst Leitz G.m.b.H., Wetzlar (Lahn), Germany
Filed Dec. 21, 1966, Ser. No. 603,515
Claims priority, application Germany, Dec. 23, 1965, L 52,466
Int. Cl. G01t 1/11
U.S. Cl. 250—83                8 Claims

ABSTRACT OF THE DISCLOSURE

A dosimeter for repeated use for the measurement of ionized radiation, such as beta and gamma rays, formed of a foil of thermoluminescent and synthetic material, by changing the energy level of a portion of the foil exposed to such radiation by heat. The foil when heated, by infra-red rays directed to the portion thereof desired, produces thermoluminescent light which can be evaluated to quantatively determine the original ionized irradiation. The same foil can be used repeatedly for evaluation of a single dose of ionized irradiation by subsequently heating single portions while heat-insulating the other parts of the foil.

The synthetic material must tolerate the temperature at which the foil is heated by the infra-red rays and must possess at least one strong absorption band in or adjacent the infra-red spectral region.

BACKGROUND OF THE INVENTION

Field of the invention

This invention relates to thermoluminescent dosimeters, and more particularly, to dosimeters formed of a foil of thermoluminescent and synthetic material.

Description of the prior art

It is well known that certain materials, such as natural calcium fluoride, go into a state of excitation upon radioactive irradiation, such as gamma-radiation. This state of excitation can be nullified by heating the calcium fluoride whereby there is an emission of visible light. Known dosimeters are based on this property of the calcium fluoride and other similar substances. During this process, the material, better known as thermoluminescing material, is filled in a fine grained state into suitable containers, or is used in the form of small monocrystal blocks (pigs) or monocrystal rods (pins). A monocrystal rod of manganese-doped lithium fluoride is known as a gamma dosimeter, for example.

However, these known dosimeters are relatively delicate and fragile as a result of the containers used, mostly glass tubes. Furthermore, the evaluation or analysis of such dosimeters after ionized irradiation is rendered difficult by the type of heating heretofore used. An additional disadvantage of prior dosimeters lies in the fact that all ionized irradiation information is lost when the small tubes or rods (pins) are heated for evaluation, so that it becomes impossible to recheck or later verify the dose. This is considered a very serious disadvantage, so that thermoluminescence dosimeters, in spite of their high sensitivity (for instance up to approximately 10 millirad, where a rad is 100 ergs per gram), are by far not as frequently used as other type dosimeters.

It has also been proposed heretofore that thermoluminescing material be incorporated into synthetic material, for example, formed into little rods, cubes or blocks. However, this form for processing does not permit necessary repeated evaluations (analysis).

SUMMARY OF THE INVENTION

The dosimeter, according to my invention, avoids these disadvantages by the following means: the thermoluminescing material is incorporated into a synthetic substance which is processed into foils. The synthetic substance is selected to have the properties to (1) tolerate, at least for a short period, the temperatures required for the evaluation heating and, preferably (2) possesses strong absorption bands in the or adjacent the infra-red spectral region. It is also advantageous if the synthetic material possesses, in addition, an index of refraction which is similar to the one of the thermoluminescing material, usually 1.45 to 1.55. Synthetic materials with a silicone base are particularly suitable.

The evaluation or analysis of ionized irradiation of a dosimeter, of my invention, is particularly simple. The heating of the foil is effected by radiation with infra-red light, which can easily be measured in such quantities that the synthetic material is not damaged. In this respect, a device has been found very successful in which an infra-red radiation source, such as a Nernst needle, is used as a light source and whose radiation is passed through a chromatic divider-mirror (German "Teilerspiegel") onto the dosimeter foil. In order to increase the effectiveness, a mirror is placed behind the dosimeter foil which reflects not only the infra-red rays but also the thermoluminescence rays which rae produced during the heating process in response to the infra-red rays. The thermoluminescence light is reflected by the chromatic divider-mirror and is then passed to a suitable light-reactive element where, for instance, the total light emitted proportional to the ionized radiation dose, is measured.

Preferably, if the synthetic material has the same or almost the same index of refraction as the thermoluminescing material, the light output can be increased by the fact that no total reflection can occur between the grains of the thermoluminescing material and the synthetic material.

Synthetic materials with a silicone base are particularly suitable, because they exhibit a base absorption at approximately 3.2 microns wave length but permit, at the same time, the light in the visible spectral region to pass through completely unimpaired.

BRIEF DESCRIPTION OF THE DRAWING

The invention is illustrated, by way of example, in the accompanying drawing in which:

FIG. 1 shows diagrammatically apparatus for the determination of dosages, and

FIGS. 2 to 4 show in schematic foils for multiple dosage determination.

DESCRIPTION OF THE PREFERRED EMBODIMENTS

Referring to FIG. 1 of the drawing, the infra-red rays of an infra-red (IR) light source 1 are directed through a condenser lens 2, an infra-red filter 3 and a shutter, for instance a photographic shutter 4, through a chromatic divider-mirror 5 to a dosimeter foil 7. A collecting lens 6 is located between the chromatic divider-mirror 5 and the dosimeter foil 7. Behind the dosimeter foil 7 is a mirror 8. The thermoluminescence light radiated from the dosimeter foil 7 is reflected by the chromatic divider-mirror 5 and is led via a collecting lens 9 onto a light-reactive element 10.

The IR 1 source may be a Nernst lamp, the output of which having both infra-red and visible light rays. Accordingly the infra-red filter 3 is useful to assure only an infre-red (heating) ray to radiate the foil.

The shutter 4 is arranged for a timed-exposure to limit the irradiation of infra-red light such that the foil 7 is heated to a sufficient temperature to cause the emission of thermoluminescent light. In general, a temperature of 200° C. after about one minute of IR exposure is sufficient and satisfactory.

The chromatic divider-mirror 5 has the property of reflecting certain ranges of wave lengths while transmitting other ranges of wave lengths. Such mirrors are well known in this art and need no further description here.

The dosimeter foil 7 carries a dispersion of finely pulverized thermoluminescent material, such as calcium fluoride. Other known materials of similar properties may be used. Thus, lithium fluoride with small amounts of manganese added thereto, is quite satisfactory.

The synthetic material functions as the carrier or vehicle for the thermoluminescent material and thus must have certain properties to satisfy the needs thereof. Accordingly, the synthetic material must be workable into foil, be resistant to or heat-stable at the temperature produced by the IR ray source, at least for the time-period of the heating phase, and absorb infra-red rays so as to aid the heating of thermoluminescent material.

Furthermore, the index of refraction of the synthetic material is preferably approximately equal to that of the thermoluminescent material in order to minimize internal light reflections within the foil and to thereby maximize the thermoluminescent light during the heating step. The index of refraction of silicon base synthetic materials, are in general, between 1.45 and 1.55.

By absorption in the dosimeter foil 7, the dosimeter foil is heated by the infra-red rays. Shutter 4 has the purpose of limiting the IR-radiation dose, as indicated above. Mirror 8 is used to increase the intensity as it reflects the IR-light which passes through the dosimeter foil. This has the advantage that the heating can be effected very quickly. Quick heating is particularly important if the radiation dose stored in the dosimeter foil 7 is very small, which could make the evaluation extremely difficult. The thermoluminescent light which is radiated from the dosimeter foil 7 as a result of the heating process, is reflected by the mirror 8, to the extent to which this light leaves the foil in the direction of the mirror 8, so that it can be used for the evaluation. The thermoluminescent light passes via lens 6 onto the chromatic divider-mirror 5, on which it is reflected, in order to reach the light-reactive element 10 via lens 9. The light-reactive element 10 is part of an electronic circuit, not shown, in a commonly known maner, and does not have to be explained here in any greater detail.

Naturally, it is much easier to store the dosimeter foils according to the invention than the glass tubes which had been known up to now. Furthermore, the dosimeter foils of this invention offer another great advantage, namely the need to heat only part of their surface for evaluation. This permits repeated measurements of the same radiation dose which the foils have been exposed to. This is particularly important in those instances in which a preliminary or provisional evaluation is to be made at first, with a rough estimation, and a more exact evaluation is desired later on. As mentioned before, such a repeated evaluation is fundamentally impossible with the dosimeters heretofore known. In the case of multiple or repeated evaluations, care has to be taken that, during the heating of only partial surface of the foil, the other parts of the foil surface which are to be evaluated later on are kept sufficiently cooled, in order to prevent an undesirable illumination within the foil as a result of heat conduction.

Depending upon the size of the foil, two or more segments may be evaluated. FIGS. 2 to 4 show various forms of dividing or apportioning the sensitized areas. Thus, FIG. 2 shows a division into two segments. In practice, a strip 13 is provided between the segments 11 and 12, in order to reduce the heat transfer between 11 and 12. FIG. 3 shows four segments 14–17 of the same general type, FIG. 4 finally shows three circular rings 18–20 and a central circle 21. This last-mentioned form is preferred, because good illumination of circles can be carried out with greater optical accuracy than the illumination of segments.

After all dose measurements of a foil have been completed, the foil is heated again as a whole in an oven, for example, for a brief period of time, at a temperature of 200° C., without further measuring. The deactivated foil is now ready once more for a new dose of radiation to be measured.

A preferred silicon base is a clear silicon compound of the General Electric identified as RTV 602.

I claim:

1. A dosimeter for ionizing radiation suitable for repeated analysis of radiation doses by infra-red heating comprising a foil responsive to heating of selective portions of said foil for analysis of exposure of said foil to prior radiation and further, being non-responsive to said heating in the remaining portion of said foil during the selective heating for analysis, whereby a thermoluminescent light is emitted from said selected foil portion substantially proportional to the radiation, said foil comprising a synthetic material having the property of at least one absorption band near or in the infra-red spectral region and being tolerant to the dose evaluation upon analysis by heating, and a thermoluminescent material dissolved in said synthetic material.

2. A dosimeter according to claim 1 characterized in that the index of refraction of said synthetic material and said thermoluminescent material is substantially equal.

3. A dosimeter according to claim 2 wherein the index of refraction is within the range of 1.45 and 1.55.

4. A dosimeter according to claim 1 characterized by a plurality of discrete foil surfaces, said discrete surfaces being separated by a strip of material of relatively lower heat transfer property than said foil.

5. A dosimeter according to claim 4 wherein said surfaces are concentric rings.

6. A dosimeter according to claim 4 wherein said surfaces are segments.

7. A dosimeter according to claim 1 wherein said synthetic material is of a silicon base.

8. A method for using a dosimeter of the type described comprising the steps of:
    (a) exposing the dosimeter to ionized radiation,
    (b) subsequently irradiating for a predetermined period of time a portion of the surface of the dosimeter with rays from an infra-red source while passing said rays through a chromatic-divider-mirror and simultaneously heat-insulating the remaining surface of the dosimeter thereby preventing the dosimeter from luminescing,
    (c) reflecting light rays evolved from the irradiated dosimeter on the reflecting surface of said chromatic divider-mirror to light reactive means for determining the dose of ionized radiation, and
    (d) subsequently irradiating from an infra-red source still another portion at least of the remaining portion of the dosimeter while simultaneously heat-insulating the remaining surface portions thereof whereby a single dose of ionized radiation on said dosimeter is repeatedly determined by the sequential evaluations of the selected portions of said dosimeter.

References Cited

UNITED STATES PATENTS

| 2,761,070 | 8/1956 | Moos et al. | 250—71 |
| 3,007,053 | 10/1961 | Merlen. | |
| 3,361,910 | 1/1968 | Morehead | 250—83 X |
| 3,376,418 | 4/1968 | Letter | 250—83 |

RALPH G. NILSON, Primary Examiner

D. L. WILLIS, Assistant Examiner

U.S. Cl. X.R.

250—71